(12) United States Patent
Miyazaki

(10) Patent No.: US 10,406,619 B2
(45) Date of Patent: Sep. 10, 2019

(54) HEATING CARTRIDGE AND HEATING TOOL WITH SAME

(71) Applicant: Hakko Corporation, Osaka-shi, Osaka (JP)

(72) Inventor: Mitsuhiko Miyazaki, Osaka (JP)

(73) Assignee: Hakko Corporation, Osaka (JP)

(*) Notice: Subject to any disclaimer, the term of this patent is extended or adjusted under 35 U.S.C. 154(b) by 424 days.

(21) Appl. No.: 15/240,247

(22) Filed: Aug. 18, 2016

(65) Prior Publication Data

US 2017/0050251 A1 Feb. 23, 2017

(30) Foreign Application Priority Data

Aug. 21, 2015 (JP) ................. 2015-164033

(51) Int. Cl.
| | |
|---|---|
| *H05B 6/10* | (2006.01) |
| *B23K 3/03* | (2006.01) |
| *H02G 1/12* | (2006.01) |
| *B23K 1/00* | (2006.01) |
| *B23K 101/42* | (2006.01) |

(52) U.S. Cl.
CPC .......... *B23K 3/0353* (2013.01); *B23K 1/0016* (2013.01); *H02G 1/1275* (2013.01); *B23K 2101/42* (2018.08)

(58) Field of Classification Search
CPC ...... B23K 1/0016; B23K 3/025; B23K 3/026; B23K 3/027; B23K 2101/42; B23K 3/0353

See application file for complete search history.

(56) References Cited

U.S. PATENT DOCUMENTS

| | | | | |
|---|---|---|---|---|
| 4,560,101 A | * | 12/1985 | Wilhelmson | ........... B23K 1/018 228/54 |
| 4,798,934 A | * | 1/1989 | Boyer | ................. B23K 3/0346 16/431 |
| 5,569,400 A | * | 10/1996 | Lee | ...................... B23K 3/0392 219/229 |
| 6,054,678 A | | 4/2000 | Miyazaki | |
| 6,710,304 B2 | | 3/2004 | Yokoo | |
| 7,807,949 B2 | | 10/2010 | Miyazaki | |

* cited by examiner

*Primary Examiner* — Brian W Jennison
(74) *Attorney, Agent, or Firm* — Squire Patton Boggs (US) LLP

(57) ABSTRACT

A heater cartridge comprises a heater contained within a distal section of housing pipe near a working portion, such as soldering iron tip or a blade for stripping wire. The wall thickness of the housing pipe is generally thin to limit heat transfer to a proximal section of the housing pipe near where a user's hand would be normally located. The wall thickness is thinner in a region near the heater as compared to a region expected to have a high bending moment.

11 Claims, 3 Drawing Sheets

HEATING CARTRIDGE AND HEATING TOOL WITH SAME

CROSS-REFERENCE TO RELATED APPLICATION

This application claims the benefit of Japan Patent Application No. 2015-164033, filed Aug. 21, 2015, which is incorporated herein by reference in its entirety for all purposes.

FIELD

This invention relates generally to devices for applying heat to a work piece.

BACKGROUND

Various types of tools for applying heat to a work piece are known in the art. Examples of such heating tools include without limitation soldering irons and thermal wire strippers. Such heating tools have a heater that generates heat that is applied to the work piece. The heater can be placed in pipe extending from a handle. See, for example, U.S. Pat. Nos. 6,054,678, 6,710,304 and 7,807,949, which are incorporated herein by reference. For the operator's comfort, the heater is typically located at a sufficient distance away from a handle held by the user of the heating tool. Also, the walls of the pipe are intentionally made thin so as to suppress heat transfer to the handle. When the heating tool is brought into contact with a work piece so as to apply a desired amount of force, the thin walls of the pipe may deform or deflect due to a reaction force from the work piece. Usually the deflection is not controlled, making it difficult to apply the desired amount of force to the work piece. This may result in reduced productivity and/or product quality. For example, the heating tool may be a thermal wire stripper that is used to apply a force onto in insulation cover so as to remove the insulation cover from a core wire. As the user grips the handle of the thermal wire stripper, the force transmitted to the work piece is often reduced due to deflection of one or more parts of the heating tool, and the reduced force may result in incomplete removal of the insulation cover.

There is a continuing need for enhanced heat transfer from heater to the workpiece and a need to reduce heat transfer in a direction toward the handle of heating tools. There is also a continuing need to enhance the strength of such tools without an undue increase in heat transfer toward the handle.

SUMMARY

Briefly and in general terms, the present invention is directed to a heating cartridge and a heating tool for applying heat to a work piece.

In aspects of the invention, a heating cartridge comprises a heater, and a housing pipe, the heater housed inside the housing pipe, the housing pipe having an axial length divided into at least a first length and a second length, the second length extending axially from the first length, at least a portion of the heater is located within the first length, the housing pipe having a wall thickness, and the wall thickness in at least a portion of the first length being thinner than in the second length.

In aspects of the invention, a heat tool comprises the heating cartridge, and a handle connected to a part of the housing pipe of the heating cartridge, the part located within the second length of the housing pipe.

The features and advantages of the invention will be more readily understood from the following detailed description which should be read in conjunction with the accompanying drawings.

DETAILED DESCRIPTION OF THE INVENTION

As used herein, the word "soldering" refers to a process, apparatus, assembly, tool or device involving the application and/or removal of molten metal to/from a work piece. A non-limiting example of a molten metal is solder.

As used herein, a work piece can be a metal object or a non-metal object. Examples of a work piece include without limitation solder materials, filler materials, wires, printed circuit boards, electrical components, and electronic devices.

As used herein the word "proximal" may refer to a portion of heating cartridge, heating tool, or other type of device that is usually located closer or proximate to another portion of the device that is held by the user, as compared to a "distal" portion of the device which is located further away or distant from the portion of the device that is held by the user. The word "proximal" may refer to a direction toward the portion of the device that is held by the user, and the word "distal" may refer to a direction away from the portion of the device that is held by the user.

As used herein, the word "axial" may refer to a direction that is parallel or substantially parallel to an imaginary major axis or to an imaginary central axis of the structure(s) being referenced. For example, an axial length of a part is the length dimension of the part measured in a direction that is parallel or substantially parallel to a major axis or to a central axis of that part. As a further example, an axial position of a part in relation to two other parts refers to a position along an imaginary axis that connects the two parts.

The present invention encompasses tools for applying heat to a work piece. As described below, such tools may include a housing pipe that encloses a heater. The pipe may have thin walls to minimize the amount of heat conducted toward at area of the tool that a user would normally grip. The wall could be made thicker to limit the amount of deflection of the pipe. However, thicker walls may conduct excessive heat toward the user's hand. As will be discussed below, certain design features could, in optional aspects of the invention, allow for a reduction in both deflection and heat transfer to the user's hand.

Figure 1:
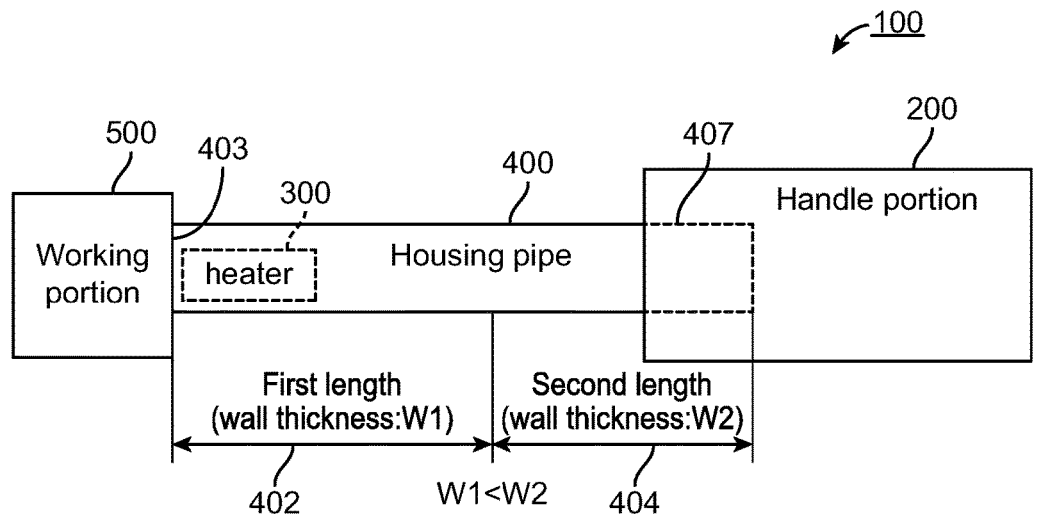
FIG. 1 is schematic block diagram showing an exemplary heating tool.

Referring now in more detail to the exemplary drawings for purposes of illustrating aspects of the invention, wherein like reference numerals designate corresponding or like elements among the several views, there is shown in FIG. 1 exemplary heating tool 100.

Heating tool 100 can take the form of a variety of tools designed to use heat energy. Examples of such tools include without limitation thermal wire strippers and soldering irons.

Heating tool 100 includes handle 200, heater 300, housing pipe 400, and working portion 500. Handle 200 is designed to be gripped by a person (a user). Handle 200 optionally includes circuitry to supply power to heater 300 and/or circuitry to control the power being supplied. Handle 200 includes holding structures that either fixedly secure or removably support housing pipe 400. Handle 200 may have any shape and include any holding structure to adapt tool 100 for a particular use such as soldering or wire stripping.

Housing pipe 400 extends from handle 200. Optionally, housing pipe 400 is configured to be detachable, without damage, from handle 200. For example, if housing pipe 400 is configured to be detachable, housing pipe 400, heater 300, and working portion 500 may be parts of a heating cartridge that is removable from handle 200. Non-limiting examples of a heating cartridge are described below.

Housing pipe 400 is conceptually separated into first length 402 and second length 404. That is, housing pipe 400 has an axial length that is divided into first length 402 and second length 404. First length 402 is a certain length extending from working portion 500. Second length 404 is the certain length extending from first length 402 toward handle 200.

Figure 2:
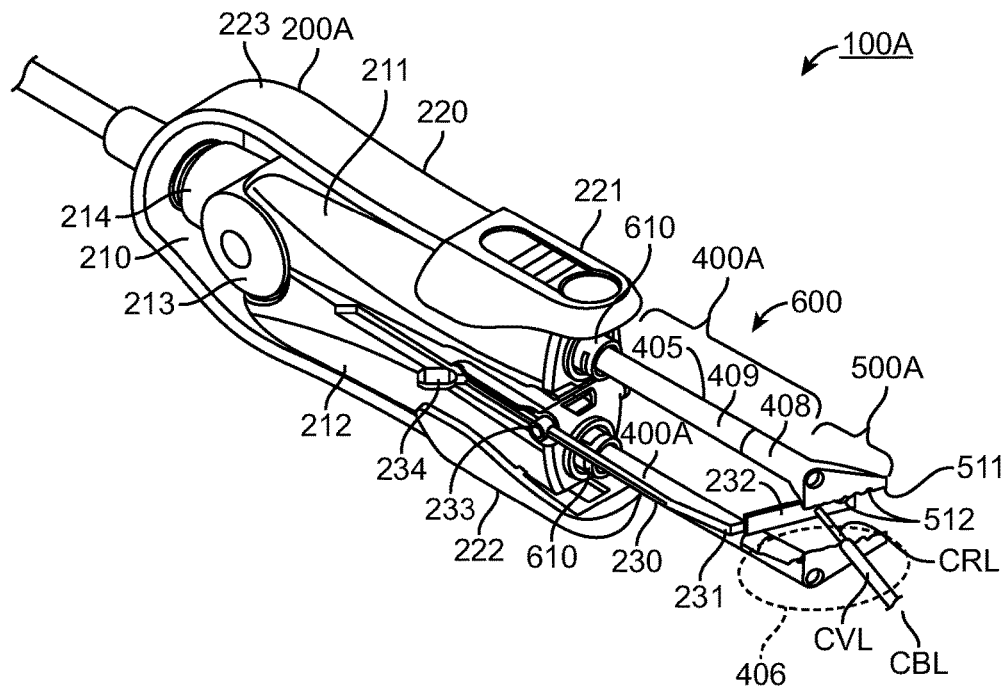
FIG. 2 is a perspective view of an exemplary thermal wire stripper.

Working portion 500 is connected to housing pipe 400 at boundary 403 of first length 404. Working portion 500 is connected to a part of housing pipe 400 located in first length 402. Heater 300 is at least partially disposed in first length 402 of housing pipe 400. In FIG. 2, heater 300 is disposed entirely within first length 402. This configuration allows working portion 500 to efficiently receive heat energy produced by heater 300.

Handle 200 is connected to a part of housing pipe 400 located in second length 404. Optionally, as shown in FIG. 1, housing pipe 400 includes insert segment 407 which is configured for insertion into handle 200. Housing pipe 400 has a wall thickness. In first length 402, the wall thickness is W1. In second length 404, the wall thickness is W2, which is greater than W1. The thinner wall thickness in first length 402 may make it less likely for heat from heater 300 to be conducted to second length 404. As a result, excessive heating of handle 200 may be prevented.

Housing pipe 400 may have various structural configurations. Housing pipe 400 may comprise multiple pieces of pipe. For example, housing pipe 400 may be formed by a straight pipe (first pipe) extending through at least first length 402 and second length 404, and an insertion pipe (second pipe) having a smaller diameter and shorter axial length than the straight pipe. The insertion pipe is inserted in the straight pipe. The insertion pipe defines the extent (i.e., defines opposite ends) of second length 404. A spring pin may be used as the insertion pipe.

Alternatively, housing pipe 400 may be formed from a straight pipe (first pipe) extending through first length 402 and second length 404, and a proximal pipe (second pipe) having a larger diameter and shorter axial length than the straight pipe. The straight pipe is inserted in the proximal pipe. The proximal pipe defines the extent (i.e., defines opposite ends) of second length 404.

Alternatively, housing pipe 400 may be formed from only a single pipe. The single pipe has a constant outer diameter through first length 402 and second length 404. The single pipe has an inner diameter that is not constant. The inner diameter is larger at first length 402 than at second length 404.

Alternatively, housing pipe 400 may be formed from only a single pipe, and the single pipe may have a constant inner diameter through first length 402 and second length 404. The single pipe has an outer diameter that is not constant. The outer diameter is smaller at first length 402 than at second length 404.

Heater 300 is placed close to working portion 500. Heater 300 occupies a position within first length 402 without crossing into second length 404. That is, heater 300 does not occupy a position within second length 404. Thus, heater 300 is separated from handle 200 so that handle 200 does not become uncomfortably warm.

Working portion 500 may have various structural configurations. The structural configuration may depend on the intended use of heating tool 100. For example, if the heating tool 100 is a soldering iron, working portion 500 can be a soldering iron tip. If the heating tool 100 is a thermal wire stripper, working portion 500 may be a blade to optionally strip insulation off of a wire. These are non-limiting examples, and working portion 500 may have other structural configurations.

The person (the user) using the heating tool 100 may place working portion 500 in contact with a work piece to heat the work piece. Due to contact, working portion 500 will experience a reaction force from the work piece. The reaction force is transmitted to first length 402 of housing pipe 400. The axial dimension (length) of first length 402 takes in to account two countervailing factors: deflection of housing pipe 400 and heat transfer to handle 200. The axial dimension (length) of first length 402 is selected so that deflection of housing pipe 400 is small enough that it will not have an adverse effect on the function of heating tool 100 while at the same time the amount of heat conducted to second length 404 is small enough that the user can continue working without handle 200 becoming uncomfortably warm.

As mentioned above, heating tool 100 may take the form a thermal wire stripper. An exemplary thermal wire stripper is described below.

FIG. 2 shows exemplary thermal wire stripper 100A which corresponds to heating tool 100 in FIG. 1. The descriptions provided above for heating tool 100, handle 200, heater 300, housing pipe 400, and working portion 500 may also apply to thermal wire stripper 100A and its components/regions 200A, 300A, 400A, and 500A. The letter "A" designates particular features that adapt the tool of FIG. 1 for use as wire stripper.

Wire stripper 100A includes handle 200A and a pair of blade cartridges 600. Handle 200A corresponds to handle 200 in FIG. 1. Each blade cartridge 600 (an exemplary type of heating cartridge) corresponds to an assembly that includes heater 300, housing pipe 400, and working portion 500 in FIG. 1

The handle 200A includes a Y-shaped support body 210, U-shaped operation part 220, and adjustment gauge 230. Support body 210 holds the two blade cartridges 600. The user may partially strip away the insulation cover (CVL) off of a cable (CBL) to expose an underlying core wire (CRL). The user does this by gripping operation part 220 to move the distal ends of blade cartridges 600 from a normally open position shown in FIG. 2 to a closed position in which the distal ends of blade cartridges 600 come into contact. The cable is inserted between the distal ends of blade cartridges 600 while in the normally open position, then the cable is clamped between the distal ends while in the closed position to allow the insulation cover to be stripped away to expose the core wire. When inserting the cable between the distal ends of blade cartridges 600, adjustment gauge 230 limits the amount of insertion and thereby sets the desired length of the core wire which is to be exposed.

As shown in FIG. 2, the Y-shaped support body 210 includes two arms joined together by a joint. The two arms are first support 211 and second support 212. The joint is hinge 213. Support body 210 further includes cable connector 214 that extends out of hinge 213. One of the blade cartridges 600 is partially inserted into first support 211. The other blade cartridge 600 is partially inserted into second support 212. Each of first support 211 and second support 212 includes a chuck mechanism configured to rigidly support the blade cartridge.

When the user squeezes operation part 220, the force applied to operation part 220 is transmitted to first support 211 and second support 212. The force causes first support 211 and second support 212 pivot from hinge 213 so as to rotate inwardly toward each other. The rotation brings blade cartridges 600 from the normally open position (FIG. 2) to the closed position in which distal ends of blade cartridges 600 are in contact and/or clamp onto a cable.

Cable connector 214 extends out from the hinge 213 in a direction away from first support 211 and second support 212. Cable connector 214 passes through operation part 220. Power is supplied via cable connector 214, and is electrically connected to a part of each blade cartridge 600 located within support body 210 (for example, power line 310 in FIG. 3). This allows the heaters in the blade cartridges 600 to receive electrical power used to generate heat.

Support body 210 and blade cartridges 600 may optionally include electronic components for supplying power and controlling the level of heat generated. Alternatively, those electronic components may be located outside of support body 210 and blade cartridges 600 such that the electronic components are located beyond cable connector 214.

As shown in FIG. 2, the U-shaped operation part 220 includes two legs joined together. The two legs are pressing part 221 and pressing part 222, both of which are joined together by elastic base 223. Pressing parts 221, 222 are attached to free ends of support body 210 (attached to free ends of first and second supports 211, 212) located opposite from hinge 213. Elastic base 223 is bent between pressing parts 221, 222. Elastic base 223 partially surrounds first and second supports 211, 222 and hinge 213. An aperture is formed through elastic base 223. Cable connector 214 passes through the aperture.

When the user squeezes pressing parts 221, 222 together, elastic base 223 will deform. The deformation allows first and second supports 211, 212 to pivot on hinge 213 as previously described to move blade cartridges 600 from the normally open position to the closed position. Deformation of elastic base 223 is elastic. Thus, when the user releases pressing parts 221, 222 to reduce the amount of force applied to pressing parts 221, 222, a restoring force of the elastic base 223 will pivot first and second supports 211, 212 away from each other to return blade cartridges 600 to the normally open position.

Adjustment gauge 230 comprises rod 231, contact plate 232, holding pin 233, and tab 234. Rod 231 extends along blade cartridges 600. Rod 231 is connected to holding pin 233, which is attached to second support 212. Holding pin 233 allows movement of rod 231 in the axial (longitudinal) direction of rod 231. Tab 234 protrudes out from rod 231. The user may manipulate tab 234 to move rod 231. Contact plate 232 is attached to the distal end of rod 231. By moving rod 231, the user is able place contact plate 232 at a desired position where contact plate 232 will abut the end of the cable (CBL) that is to be stripped of insulation. When pressing parts 221, 222 are pressed together and blade cartridges 600 moved to the closed position, the insulation cover (CVL) of the cable is cut to allow its removal from the core wire (CRL). The length of the exposed core wire is determined by the position of contact plate 232.

As shown in FIG. 2, each blade cartridge 600 includes support pipe 405, blade piece 406, and flange 610. Support pipe 405 and a portion (connecting pipe 408) of blade piece 406 together form housing pipe 400A which corresponds to housing pipe 400 of FIG. 1.

For each blade cartridge 600, flange 610 connects support pipe 405 to support body 210. In particular, flange 610 connects support pipe 405 to either one of the first and second supports 211, 212 of support body 210. Flange 610 may be inserted into the chuck mechanism located inside the respective one of the supports 211, 212. The chuck mechanism releases blade cartridge 600 when blade cartridge 600 is pulled out of and detached from support body 210.

Mechanisms other than a chuck may be used as the connection between flange 610 and support body 210. The connection between flange 610 and support body 210 is not limited to what described herein, and other mechanisms known in the art may be implemented.

As shown in FIG. 2, blade piece 406 includes connecting pipe 408 and blade 500A. Support pipe 405 and connecting pipe 408 together correspond to housing pipe 400 of FIG. 1. Blade 500A corresponds to working portion 500 of FIG. 1.

Blade 500A includes a blade edge 511. Multiple notches 512 are formed into blade edge 511. Each notch 512 is a half-circular depression. Each notch 512 is a different size from the other notches 512. There may be a mark next to each notch 512 to indicate the size of the wire intended for the notch. Each mark may be a numeral indicating size in terms of American wire gauge (AWG) for an adjacent one of the notches 512. During a stripping operation, the notch having the appropriate size is selected by the user considering the diameter of the core wire of the cable.

The length of insulation to be stripped is equivalent to the distance between blade edge 511 and contact plate 232 attached to second support 212. When blade cartridges 600 are moved to the closed position, blade edges 511 of blade cartridges 600 will cut the insulation cover that surrounds the core wire, while the core wire rests within a pair of opposing notches 512 and is not cut.

Connecting pipe 408 is partially pressed-in inside distal end segment 409 of support pipe 405 and fixedly secured to distal end segment 409.

Figure 3:
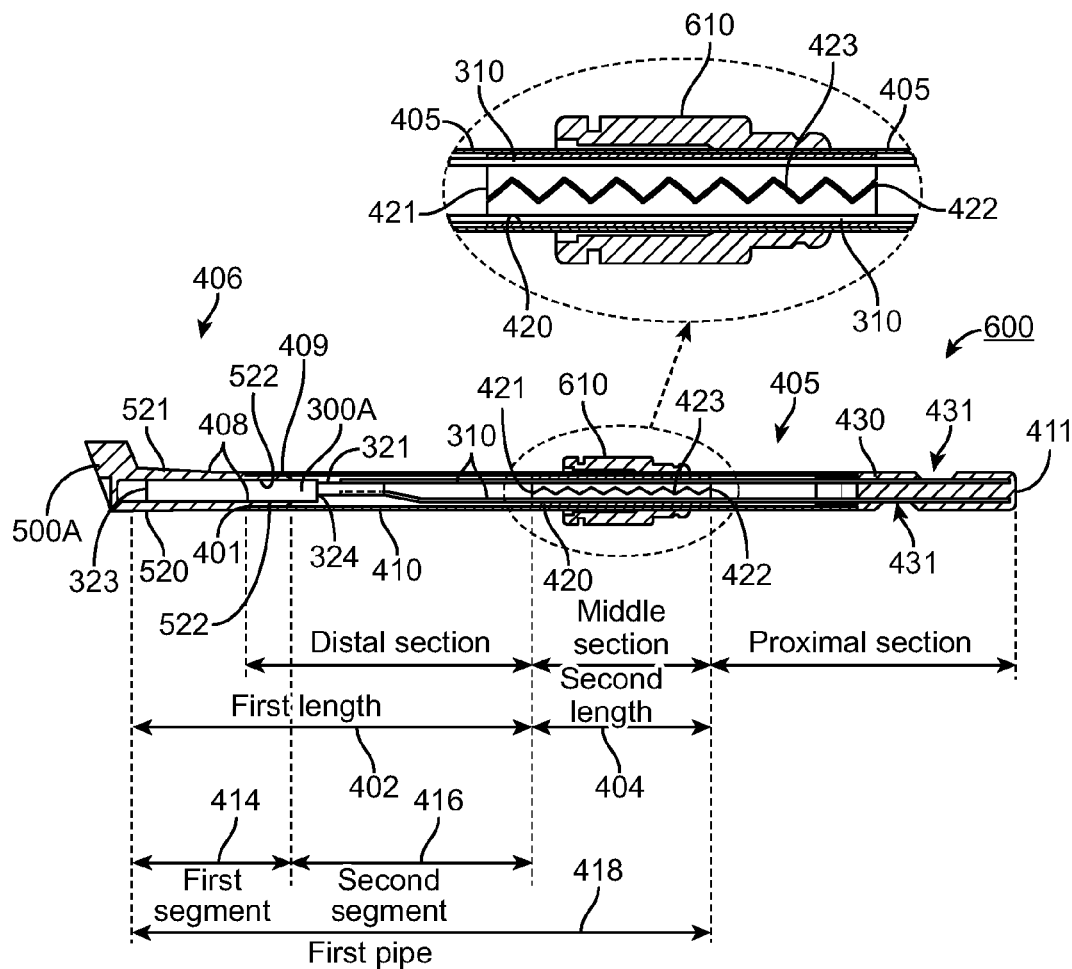
FIG. 3 is a cross-section view showing an exemplary blade cartridge of the thermal wire stripper of FIG. 2.

FIG. 3 shows an exemplary cross section of blade cartridge 600. Elements of blade cartridge 600 may correspond to elements labeled with like numerals in FIGS. 1 and 2.

As shown in FIG. 3, support pipe 405 has an axial length that is conceptually divided to a distal section, a middle section, and a proximal section. The distal section begins at distal end 401 of support pipe 405. The distal section of support pipe 405 and connecting pipe 408 correspond to first length 402 of FIG. 1.

Support pipe 405 is formed by main pipe 410, which is a thin-walled, hollow cylinder. Support pipe 405 may optionally be formed by main pipe 410 and insulation part 430 which is connected to main pipe 410. Insulation part 430 will be described below.

The middle section extends entirely between the distal section and the proximal section. The middle section corresponds to second length 404 of FIG. 1. Flange 610 is mounted on support pipe 408 at a location within the middle section.

Blade cartridge 600 includes support pipe 405, blade piece 406, flange 610, heater 300A, intermediate heater portion 321, and power line 310.

Heater 300A is located within and extends into both connecting pipe 408 of blade piece 406 and distal end segment 409 of support pipe 405. Connecting pipe 408 has a cylindrical wall thickness that is greater than that of distal end segment 409.

Connecting pipe 408 and the distal and middle sections of support pipe 405 may together be referred to as a "first pipe." Another pipe, which can be referred to as a "second pipe,' is inserted within the middle section of support pipe 405. First pipe 418 includes first segment 414 and second segment 416. First segment 414 is connected to working portion 500A, while second segment 416 extends from first segment 414 and is at an axial position between first segment 414 and second pipe 420. First pipe 418 has a first pipe wall thickness that is thicker at first segment 414 than at second segment 416. The first pipe wall thickness includes the combined wall thicknesses of the overlapping portions of support pipe 405 and connecting pipe 408. Second pipe 420 is inserted within first pipe 418, which provides a combined wall thickness which is greater than the wall thickness at second segment 416 of first pipe 418.

The relatively thicker wall thickness of first segment 414 allows for good conduction of heat energy from heater 300A to blade 500A while the relatively thinner wall thickness of second segment 416 keeps conduction of heat energy from heater 300A to flange 610 at a low level. Since flange 610 is normally connected to handle 200A (FIG. 2), heat transfer to handle 200A is also kept at a low level. At the same time, the combined wall thickness at the section where second pipe 420 is inserted within first pipe 418 prevents deflection or keeps deflection at minimum.

Heater 300A corresponds to heater 300 of FIG. 1. Power line 310 extends from heater 300A to the proximal section of support pipe 405. Heater 300A includes a coiled heater wire. Intermediate heater portion 321 protrudes from heater 300A and connects the coiled heater wire to power line 310.

Still referring to FIG. 3, distal end 323 of heater 300A is contained within connecting pipe 408 of the blade piece 406. Proximal end 324 of heater 300 is contained within support pipe 405. Power line 310 is connected to and supplies electrical power to intermediate heater portion 321, which is connected to and supplies electrical power to the coiled heater wire of heater 300A.

Connecting pipe 408 of blade piece 406 includes exposed part 521 and inserted part 522. Exposed part 521 is located outside of support pipe 405 and is exposed to the surrounding environment. Exposed part 521 is the portion of blade piece 406 that is between blade 500A and inserted part 522. Inserted part 522 is attached to and extends from exposed part 510. Inserted part 522 has an outer diameter that is smaller than that of exposed part 510. Inserted part 522 is inserted into distal end segment 409 of support pipe 405.

An abrupt change in the outer diameter occurs between exposed part 521 and inserted part 522. The abrupt change forms a step on the outer surface of blade piece 406. Distal end segment 409 of support pipe 405 abuts the step when blade piece 406 is pushed into support pipe 405.

As previously discussed, support pipe 405 is conceptually divided into distal, middle, and proximal sections. As shown, support pipe 405 may comprise main pipe 410 and insulation part 430. Main pipe 410 runs the entire length of the distal and middle sections, and continues into the proximal section. Insulation part 430 is located within the proximal section where it is connected to main pipe 410. As discussed below, spring pin 420 is located within main pipe 410 and defines the middle section.

Connecting pipe 480 protrudes out of main pipe 410. Connecting pipe 408 and main pipe 410 may together correspond to a "first pipe" having an axial length divided into at least first length 402 and second length 404. As discussed below, spring pin 420 is located within main pipe 410, and spring pin 420 may correspond to a "second pipe" that defines the second length 404.

Insulation part 430 is rod shaped and made of an electrical insulator material. Insulation part 430 forms a part of the proximal section. A proximal end segment of main pipe 410 forms the remainder of the proximal section. The proximal section functions as an insert segment housing pipe 400 of FIG. 1, where the insert segment is configured for insertion into a handle of a heating tool.

Power line 310 includes two wires that extend into insulation part 430. Insulation part includes two concaved portions 431. Each power line wire enters a respective one of the concaved portions 431 where a portion of the wire becomes exposed to the surrounding environment when cartridge 600 is pulled out of and detached from handle 200A. Insulation part 430 functions as an electrical connector, and the exposed portions of the power line wires function as electrical contacts for receiving electrical energy from a power supply. Spring pin 420 occupies an axial position between heater 300A and insulation part 430.

Referring to FIG. 3, spring pin 420 is a hollow cylinder. Spring pin 420 occupies an internal cavity of main pipe 410. The wires of power line 310 pass through spring pin 420. Spring pin 420 includes distal end 421 and proximal end 422. The boundary separating the distal section and the middle section is defined by distal end 421. Distal section extends from distal end 401 of main pipe 410 to distal end 421 of spring pin 420. The boundary separating the middle section and the proximal section is defined the proximal end 422. Thus, opposite ends of spring pin 420 (also referred to as a second pipe) define boundaries of the middle section. Also, opposite ends of spring pin 420 define boundaries of second length 404 of FIG. 1. Proximal section extends from proximal end 422 of spring pin 420 to end 411 of insulation part 430.

Distal end 421 of spring pin 420 does not contact heater 300A. Distal end 421 is sufficiently spaced away from heater 300A. Optionally, the distance is filled with or contains air. The distance between heater 300A and spring pin 420 limits the amount of heat energy radiated to the middle section, which is where flange 610 connects blade cartridge 600 to handle 200A (FIG. 2). Also, the cylindrical wall thickness of main pipe 410 is relatively thin, as compared to the combined wall thicknesses of main pipe 410 and spring pin 420. Because the cylindrical wall thickness of main pipe 410 is relatively thin, the amount of heat conducted to the middle section is kept low. Both the separation distance and thin walls may prevent handle 200A from heating up to a level that would be uncomfortable for the user.

As previously explained, flange 610 is provided in the middle section and is connected to the handle 200A. When the user performs a wire stripping operation, a large bending moment may occur at the middle section where handle 200A and blade cartridge 600 are connected. The bending moment is greater than at the distal section and may also be greater than at the proximal section. Spring pin 420 enhances the rigidity of blade cartridge 600 in the middle section to prevent or minimize deflection of blade cartridge 600. Thus, deflection can be controlled so that productivity and product quality are not adversely affected even when there is a significant separation distance between heater 300A and flange 610 and when the wall thickness main pipe 410 is relatively thin.

Figure 4:
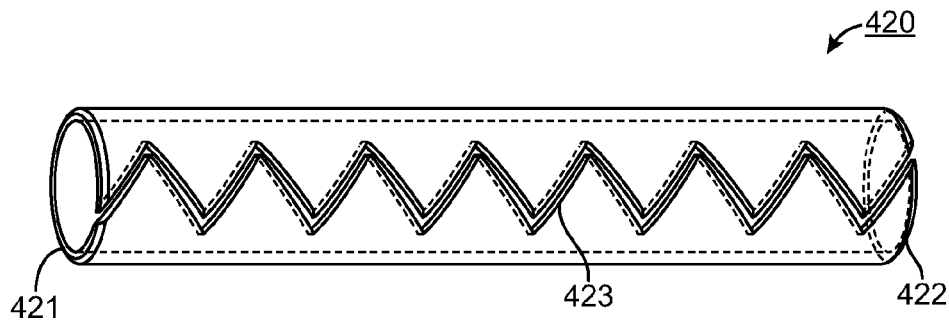
FIG. 4 is a perspective view of an exemplary spring pin used in the blade cartridge of FIG. 3.

As shown in FIG. 3, spring pin 420 has an axial length that is greater than that of flange 610. As shown in FIG. 4, slit 423 is formed through the cylindrical wall of spring pin 420. Slit 423 forms a wave shape on the outer surface of spring pin 420. Slit 423 extends across the entire axial length of spring pin 420, from distal end 421 to proximal end 422. Slit 423 enables spring pin 420 to deform by an amount determined by the width of slit 423. During an assembly process, spring pin 420 may be compressed to a reduced outer diameter. While spring pin 420 is in a compressed state, a jig may be used to place spring pin 420 at a predetermined position within main pipe 410. The position occupied by spring pin 420 within main pipe 410 defines the middle section.

Again, connecting pipe 408 and main pipe 410 may together correspond to a "first pipe" having an axial length divided into at least first length 402 and second length 404. As discussed below, spring pin 420 is located within main pipe 410, and spring pin 420 may correspond to a "second pipe" that defines the second length 404.

The shape of slit 423 on the outer surface of spring pin 420 may take other forms. For example and without limitation, slit 423 may extend in a single straight line from distal end 421 to proximal end 422.

Once spring pin 420 is released within main pipe 410, spring pin 420 may elastically expand toward original diameter. As a result of expansion, the outer surface of spring pin 420 contacts the inner surface of main pipe 410. Spring pin 420 exerts a radially outward force on main pipe 410 to help hold spring pin 420 at the desired location below flange 610. The combined thicknesses of main pipe 410 and spring pin 420 provides enhanced strength in the middle section of blade cartridge 600.

Figure 5:
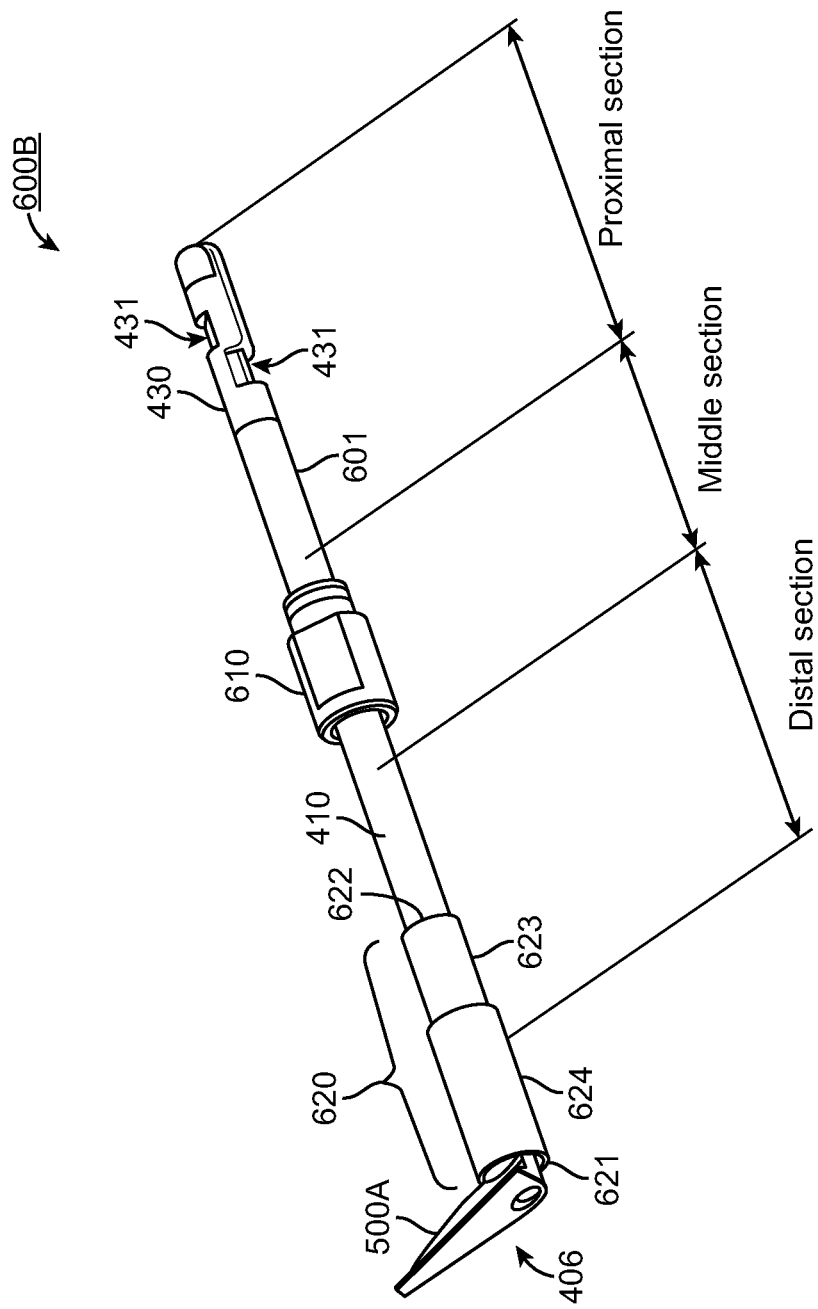
FIG. 5 is a perspective view of an exemplary blade cartridge.

As shown in FIG. 5, the blade cartridge may be configured in other ways. Except for the features associated with flare part 620 discussed below, blade cartridge 600B can be the same as blade cartridge 600 of FIG. 2 or blade cartridge 600A of FIG. 3.

Blade cartridge 600B includes cartridge body 601 and flare part 620. Flare part 620 surrounds a distal segment of main pipe 410 located within the distal section. The distal section is as previously described in FIG. 3. The distal section ends where main pipe 410 ends. Flare part 620 is located partially within the distal section. Flare part 620 has distal end 621 and proximal end 622. Distal end 621 is adjacent to blade 500A and is located outside of distal section. Proximal end 622 is located within distal section.

Flare part 620 includes connection pipe 623 and heat retaining pipe 624. Connection pipe 623 supports heat retaining pipe 624 which extends toward working portion 500A. Connection pipe 620 forms proximal end 622. Heat retaining pipe 624 forms distal end 621. Flare part 620 is attached to the main pipe 410 by connection pipe 623. The inner surface of connection pipe 623 contacts the outer surface of main pipe 410. Connection pipe 623 could be fixedly secured to main pipe 410 by welding or any other known method.

Heat retaining pipe 624 functions as a skirt that partially or entirely covers the region occupied by heater 300A. Heat retaining pipe 624 has an axial length that is greater than or equal to the axial length of heater 300A. As such, heat retaining pipe 624 is able to cover over the entire lengthwise section occupied by heater 300A. Optionally, heat retaining pipe 624 functions as a skirt that circumferentially surrounds heater 300A. Thus, heat retaining pipe 624 may completely cover heater 300A lengthwise and circumferentially.

Heat retaining pipe 624 extends over connecting pipe 408 (FIG. 3) and distal end segment 409 (FIG. 3) of main pipe 410. Heat retaining pipe 624 has an inner diameter that is larger than the outer diameter of distal end segment 409 and is also larger than the outer diameter of connecting pipe 408.

The underlying structure formed by connecting pipe 408 and distal end segment 409 may be referred to as a covered segment of a housing pipe. Heat retaining pipe 624 does not contact the covered segment. An air gap exists between heat retaining pipe 624 and the covered segment. The air gap provides thermal insulation that may help reduce heat loss and enhance transfer of heat energy from heater 300A to blade 500A.

Heater 300A may glow red hot during operation and, as a result, the surrounding structure formed by distal end segment 409 and connecting pipe 408 might also glow. In addition to providing thermal insulation, heat retaining pipe 624 may visually hide the glow so that the user is not distracted, alarmed, or annoyed by the glow.

While several particular forms of the invention have been illustrated and described, it will also be apparent that various modifications can be made without departing from the scope of the invention. It is also contemplated that various combinations or subcombinations of the specific features and aspects of the disclosed embodiments can be combined with or substituted for one another in order to form varying modes of the invention. Accordingly, it is not intended that the invention be limited, except as by the appended claims.

What is claimed is:

1. A heating cartridge for applying heat to a work piece, the heating cartridge comprising:
   a heater; and
   a housing pipe, the heater housed inside the housing pipe, the housing pipe having an axial length divided into at least a first length and a second length, the second length extending axially from the first length, at least a portion of the heater is located within the first length, the housing pipe having a wall thickness, and the wall thickness in at least a portion of the first length being thinner than in the second length,
   wherein the housing pipe comprises a first pipe and a second pipe, the first pipe extends through the first length and the second length, the second pipe is inside an interior cavity of the first pipe, and opposite ends of the second pipe define boundaries of the second length, and
   wherein the second pipe exerts a radially outward force on the first pipe, a slit is formed through the second pipe, the slit extends along the second length, and the slit allows for elastic deformation of the second pipe to an elastically compressed state for insertion into the first pipe.

2. The heating cartridge of claim 1, wherein the slit forms a wave shape on an outer surface of the second pipe.

3. The heating cartridge of claim 1, further comprising a power line connected to the heater, the power line extending from the heater toward the second pipe, the power line passing through an interior cavity of the second pipe.

4. The heating cartridge of claim 3, further comprising an electrical connector, the electrical connector including an exposed electrical contact for receiving electrical power, the power line connects the electrical connector to the heater, and the second pipe is at an axial position between the heater and the electrical connector.

5. The heating cartridge of claim 1, further comprising a working portion configured to apply heat to a work piece, the working portion connected to the housing pipe at a boundary of the first length.

6. The heating cartridge of claim 5, wherein the working portion includes a blade configured to strip an insulation cover off of a core wire.

7. The heating cartridge of claim 5, wherein the working portion includes a soldering iron tip configured to apply or remove solder.

8. The heating cartridge of claim 5, further comprising a skirt extending toward the working portion, the skirt covering a covered segment of housing pipe, the covered segment located within the first length, wherein an air gap exists between the skirt and the covered segment.

9. The heating cartridge of claim 5, wherein the first pipe includes a first segment and a second segment, the first segment is connected to the working portion, the second segment extends from the first segment and is at an axial position between the first segment and the second pipe, the first pipe has a first pipe wall thickness that is thicker at the first segment than at the second segment.

10. The heating cartridge of claim 1, wherein the housing pipe includes an insert segment within the second length, the insert segment is configured for insertion into a handle of a heating tool.

11. A heating tool for applying heat to a work piece, the heating tool comprising:
   the heating cartridge of claim 1; and
   a handle connected to a part of the housing pipe of the heating cartridge, the part located within the second length of the housing pipe.

* * * * *